Jan. 10, 1967  O. E. FREHOLM  3,297,117
CONFORMABLE ROTARY DISK BRAKE SHOE ASSEMBLY
Filed April 30, 1965
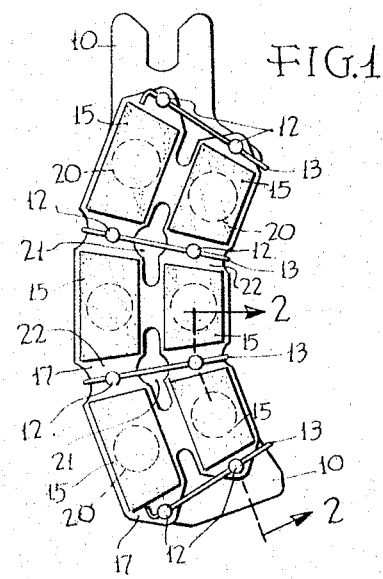
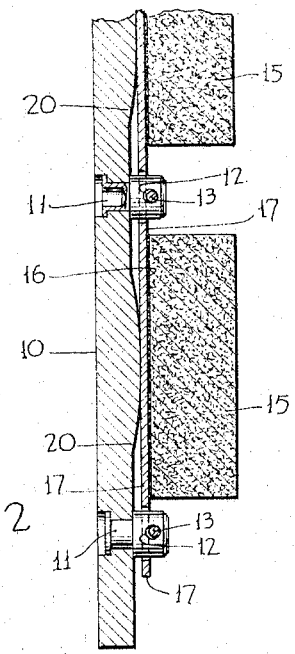
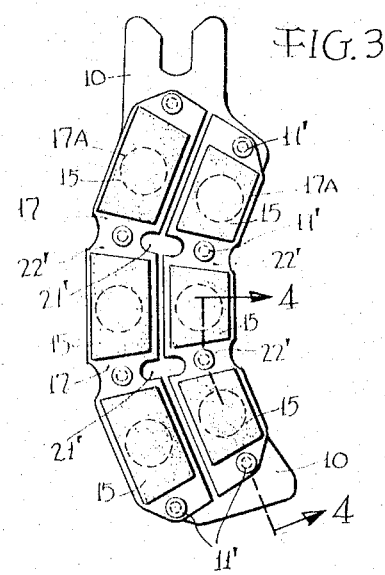
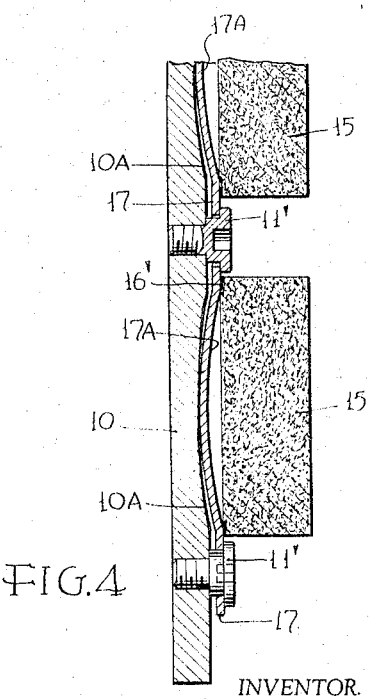
INVENTOR.
Omar E. Freholm
BY
William R. Nolte
ATTORNEY United States Patent Office 3,297,117
Patented Jan. 10, 1967

3,297,117
CONFORMABLE ROTARY DISK BRAKE
SHOE ASSEMBLY
Omar E. Freholm, Jenkintown, Pa., assignor to The Budd Company, Philadelphia, Pa., a corporation of Pennsylvania
Filed Apr. 30, 1965, Ser. No. 452,196
2 Claims. (Cl. 188—234)

This invention relates to a conformable rotary disk brake shoe assembly and has for an object the provision of improvements in this art.

The present invention lies in the same general field as that of U.S. Patents 2,451,329 Gaenssle and 2,451,326 Eksergian. As explained in those patents, heavy-duty disk brakes, as for railway vehicles, may at times develop heat at a very high rate, which heat must largely be removed from the friction surface through the metal brake disk. If the brake disk has an uneven surface, as may be the case after use even though truly planar when new, the high spots may produce local zones of unusually high temperature which can cause heat checks or cracks in the brake disk and greatly increase local wear on the brake shoe lining.

In those patent embodiments the situation was relieved by providing each brake shoe with a plurality of brake shoe lining blocks or elements and backing them with resilient pads so that each segmental lining block could have separate conformatory universal tilting movement relative to the turning brake disk. This conformatory movement may be described as a tilting in a plurality of directions, as about axes parallel to the brake disk surface and extending in all directions in a plane parallel to the mean surface plane of the brake disk.

The constructions provided by these patents, over the years, gave very satisfactory service and the present invention aims to maintain the advantages of the patent constructions but with improvements thereon.

One of the particular objects of the present invention is to provide a construction of this general character and effectiveness which is simpler and more economical.

Another object is to provide a brake block assembly which is composed of few and simple parts and which is easily manufactured, installed and maintained.

Another object is to provide a brake block assembly composed of parts which do not deteriorate even after long use.

Another object is to provide a brake block assembly comprising a flexible resilient backing sheet provided with local universally tilting portions beneath the several segmental brake blocks.

Another object is to provide a brake block assembly having improved plate anchoring or securing means which places the flexible resilient backing plate in localized pretensioned condition as an anti-rattle feature.

The above and other objects of the invention, as well as various novel features and advantages, will be apparent from the following description of certain exemplary embodiments shown in the accompanying drawings, wherein:

FIG. 1 is a plan or face view of a brake shoe assembly embodying the invention;

FIG. 2 is a partial enlarged section taken on the line 2—2 of FIG. 1;

FIG. 3 is a view like FIG. 1 but showing a modified form;

FIG. 4 is a partial enlarged section taken on the line 4—4 of FIG. 3.

The general disk brake assembly is shown by the above-mentioned patents and is now in general use so it is thought to be unnecessary to illustrate or describe the flat-faced rotary disk or the brake shoe operating mechanism used in such disk brake assemblies. Only the brake shoe assembly itself is shown.

The assembly for one shoe—first referring to the form shown in FIGS. 1 and 2—comprises a backing plate or shoe proper 10 which in use is removably secured on a mounting member of the shoe operating mechanism. The shoe formations needed for such securement to the mounting member are shown in FIG. 1 but it is thought to be unnecessary to describe them.

As one convenient means for removably securing the brake lining assembly on the shoe there are provided a plurality of projections or studs 11 which are staked in holes in the shoe plate 10 for permanent retention thereon, the studs being provided with transversely aligned holes 12 for receiving securing wires 13 which, after insertion, are bent on their ends for locking the assembly in position without contacting the brake disk.

The brake lining assembly comprises segmental brake blocks 15, of suitable composition material of known types commonly used, cemented on their backs, as at 16, to a sheet of resilient flexible metallic material 17.

Beneath each brake block 15 there is provided a universal rocking support between the flexible metal sheet 17 and the surface of the brake shoe 10. In the embodiment of FIGS. 1 and 2 this universal rocking or tilting surface (surface of double curvature) is provided by convex generally spherical projections 20 formed on or secured to the shoe 10. This is usually a cast or stamped part and it is easy to form the convex rocking projections on it.

The backing sheet or plate 17 in this case can be of uniform thickness and is generally planar, as a uniformly flat sheet, which is bent down by pressure at all the projections 11 and secured in springy pre-tension by the retaining wires 13.

The plate 17, being springy and mounted on the convex projections 20, will bend locally in any direction as required to permit the brake blocks 15 to tilt in any direction.

To assist the local bending of the plate, it may be provided with local cut-out portions 21 to leave narrowed connecting elements 22 between the portions underlying the brake blocks.

The construction shown in FIGS. 3 and 4 has rocking supports for each block but here provides local indented projections 17A on the plate 17 instead of on the shoe 10. If desired, the shoe 10 may be provided with seating depressions 10A for the projections 17A.

In this modification there are two separate plates, each carrying three blocks, and having narrowed connecting portions 22' to assist local bending. If desired, there may be a separate plate for each brake block.

In the modified form the eyeletted studs 11 are replaced by headed hold-down screws 11' which first bend and pre-tension the plate and then lock against shoulders provided on the screws. The threads of the screws may have a locking feature, such as that known as "Nylock" or the equivalent.

As shown in FIG. 4, there is an unsupported portion beneath the center of a block. The blocks are so thick and rigid that there will be no appreciable deformation because of this unsupported zone; but if desired, it can readily be filled in various ways, as by suitably shaping the bottom of the block or by filling the space with backing material of a suitable nature.

The form shown in FIGS. 3 and 4 is in other respects like the form of FIGS. 1 and 2 and the same reference characters are used for like parts.

The backing sheet or plate in both forms is locally resilient, specifically springy, which permits each block to tilt in any direction necessary to conform to any irregularities which may be present on the brake disk; yet the backing sheet is stiff and strong enough to take all braking loads. A resilient flexible metal sheet has been found to be very suitable for this purpose when provided with local universal tilting support elements beneath each brake block segment. Spring steel sheet material or any resilient sheet metal material may be used. It may be selected for anti-corrosive properties, if desired.

With the present constructions it is not necessary to use separate rubber backing sheet pads for each brake block as required by the patent constructions; nor is it necessary to provide cupped stampings to hold the rubber pads in position; yet all desired local universal tilting movement of the brake blocks is provided by the local rocking elements. The manufacturing operations are greatly simplified; the number of parts to make and stock is greatly reduced, one or two composite units only being needed in most cases; the danger of disarrangement in assembly and in use is eliminated; and the deterioration with use and age, characteristic of rubber pads, is eliminated.

It is thus seen that the invention provides very simple, inexpensive, and effective brake shoe assemblies which provide the universal tilting movement needed for each brake block to reduce local heat-checking of the brake disk and undue wear of the brake lining.

While certain embodiments of the invention have been described for purposes of illustration, it is to be understood that there may be various embodiments and modifications within the general scope of the invention.

What is claimed is:

1. A rotary disk brake shoe assembly, comprising in combination, a brake shoe plate having a lining supporting surface, said supporting surface having a plurality of convex projections constituting multi-direction rocking support elements extending therefrom, a plurality of segmental brake lining blocks distributed over the surface area of said shoe plate with each block disposed above rocking support elements, resilient supporting sheet means disposed beneath and bonded to said brake blocks and engaging the rocking support elements, and means securing said supporting sheet means to said shoe plate to hold it down thereon and hold it against torque produced lateral movement relative thereto, said resilient supporting sheet means comprising a springy metal sheet having local spring flexing to provide separate universal tilting movement of the brake blocks about the rocking support elements.

2. A rotary disk brake shoe assembly, comprising in combination a brake shoe having a lining supporting surface, a plurality of segmental brake lining blocks distributed over the surface area of said shoe plate, resilient supporting sheet means disposed beneath and bonded to said brake blocks and engaging the surface of said shoe plate and providing separate universal tilting movement of each brake block, said sheet means having a plurality of convex projections corresponding to said blocks and extending outwardly therefrom, and means securing said supporting sheet means to said shoe plate to hold it down thereon and hold it against torque produced lateral movement relative thereto, said resilient supporting sheet means comprising a springy metal sheet having local spring flexing to provide universal tilting movement of the brake blocks about the convex projections.

References Cited by the Examiner

UNITED STATES PATENTS 2,451,326    10/1948    Eksergian et al. _____ 188—234
3,198,294    8/1965    Stacy _____ 188—234

FOREIGN PATENTS 519,274    2/1931    Germany.

MILTON BUCHLER, *Primary Examiner.*

G. E. A. HALVOSA, *Assistant Examiner.*